US 8,199,972 B2
Jun. 12, 2012

(12) United States Patent
Erickson (10) Patent No.: US 8,199,972 B2
(45) Date of Patent: Jun. 12, 2012

(54) METHODS AND SYSTEMS FOR FAST SCAN LOCATION IDENTIFICATION

(75) Inventor: David Lee Erickson, San Jose, CA (US)

(73) Assignee: Icontrol, Inc., Santa Clara, CA (US)

( * ) Notice: Subject to any disclaimer, the term of this patent is extended or adjusted under 35 U.S.C. 154(b) by 798 days.

(21) Appl. No.: 12/367,490

(22) Filed: Feb. 6, 2009

(65) Prior Publication Data

US 2009/0198659 A1    Aug. 6, 2009

Related U.S. Application Data

(60) Provisional application No. 61/026,732, filed on Feb. 6, 2008.

(51) Int. Cl.
*G06K 9/00* (2006.01)
*G06Q 99/00* (2006.01)

(52) U.S. Cl. .......... 382/103; 382/105; 382/104; 705/28; 705/6

(58) Field of Classification Search .................. 382/103, 382/104, 105; 707/724, 728, 743, 770, 730; 700/83, 86; 345/629, 641, 677; 705/1, 26, 705/28
See application file for complete search history.

(56) References Cited

U.S. PATENT DOCUMENTS

| | | | |
|---|---|---|---|
| 6,954,697 B1 | 10/2005 | Smith | |
| 7,174,301 B2 * | 2/2007 | Florance et al. | 705/313 |
| 7,774,348 B2 * | 8/2010 | Delli Santi et al. | 707/748 |
| 7,788,252 B2 * | 8/2010 | Delli Santi et al. | 707/708 |
| 7,805,450 B2 * | 9/2010 | Delli Santi et al. | 707/754 |
| 2003/0009287 A1 | 1/2003 | Howard et al. | |
| 2003/0158668 A1 | 8/2003 | Anderson | |
| 2006/0004797 A1 * | 1/2006 | Riise et al. | 707/100 |
| 2007/0233374 A1 * | 10/2007 | Diekhans et al. | 701/209 |

* cited by examiner

*Primary Examiner* — Vikkram Bali
*Assistant Examiner* — Nancy Bitar
(74) *Attorney, Agent, or Firm* — Martine Penilla Group, LLP (57) ABSTRACT

An unknown named territory encloses a known physical target location that is specified by a target longitude and a target latitude. An operation is performed to identify a number of rectangular-shaped terrestrial areas that each enclose both the target longitude and the target latitude. Each of the identified rectangular-shaped terrestrial areas respectively encloses a polygonal-shaped named territory. Each polygonal-shaped named territory is defined by a respective circumscribing set of contiguously positioned vectors. An operation is performed to evaluate the circumscribing sets of contiguously positioned vectors of the polygonal-shaped named territories to determine if a given polygonal-shaped named territory includes both the target longitude and the target latitude. When both the target longitude and the target latitude are found to reside within a given polygonal-shaped named territory, the identity of the given polygonal-shaped named territory is conveyed.

28 Claims, 6 Drawing Sheets

METHODS AND SYSTEMS FOR FAST SCAN LOCATION IDENTIFICATION

CLAIM OF PRIORITY

This application claims priority under 35 U.S.C. 119(e) to U.S. Provisional Patent Application No. 61/026,732, filed Feb. 6, 2008, entitled "Fast Scan Location Identification." The disclosure of the above-identified provisional patent application is incorporated herein by reference.

BACKGROUND

In many different situations it is necessary to determine a common identity of a particular location where a physical target resides, given only latitude and longitude data for the physical target's location. Current methods for associating a common identity of a particular location to a particular set of longitude and latitude values utilize a rather brute force method in which successively smaller nested areas are searched until an area is reached that includes the particular set of longitude and latitude values and is definitively associated with a single location of commonly known identity. It should be understood that the successively smaller nested areas in this method are arbitrarily defined and are not associated with named territories. Therefore, it should be appreciated that this brute force method for associating a common identity of a particular location to a particular set of longitude and latitude values can require substantial computing resources, power consumption, and solution time, which may be unacceptable for computing and power limited implementations, or where many solutions need to be simultaneously processed.

SUMMARY

In one embodiment, a method is disclosed for determining an identity of a named territory that encloses a physical target location specified by a target longitude and a target latitude. The method includes an operation for identifying a number of rectangular-shaped terrestrial areas that each enclose both the target longitude and the target latitude. Each of the number of identified rectangular-shaped terrestrial areas respectively encloses a number of polygonal-shaped named territories. Each polygonal-shaped named territory is defined by a respective circumscribing set of contiguously positioned vectors. The method also includes an operation for evaluating the circumscribing sets of contiguously positioned vectors of the number of polygonal-shaped named territories to determine if a given polygonal-shaped named territory includes both the target longitude and the target latitude. The method further includes an operation for conveying an identity of the given polygonal-shaped named territory as the named territory enclosing the physical target location, when both the target longitude and the target latitude are found to reside within the given polygonal-shaped named territory.

In another embodiment, a method is disclosed for generating a database to determine an identity of a named territory enclosing a physical target location specified by a target longitude and a target latitude. The method includes obtaining vectorized descriptions of polygonal-shaped named territories. The vectorized descriptions of the polygonal-shaped named territories are stored within a searchable database on a computer readable medium. The method also includes defining a respective rectangular-shaped terrestrial area for each polygonal-shaped named territory, such that each rectangular-shaped terrestrial area encloses its corresponding polygonal-shaped named territory as tightly as possible. The vectorized description of each rectangular-shaped terrestrial area is stored within the searchable database on the computer readable medium. The method further includes defining the searchable database on the computer readable medium such that vectorized descriptions of the rectangular-shaped terrestrial areas and their corresponding polygonal-shaped named territories are searchable to determine which polygonal-shaped named territory includes the target longitude and target latitude.

In another embodiment, a method is disclosed for determining an identity of a named route closest to a physical target location specified by a target longitude and a target latitude. The method includes an operation for identifying a number of rectangular-shaped terrestrial areas that each enclose both the target longitude and the target latitude. Each of the number of identified rectangular-shaped terrestrial areas respectively encloses a portion of polygonal-shaped named route. Each polygonal-shaped named route is defined by a respective circumscribing set of contiguously positioned vectors. The method also includes an operation for evaluating the circumscribing sets of contiguously positioned vectors of the number of polygonal-shaped named routes to determine if a given polygonal-shaped named route includes both the target longitude and the target latitude. The method further includes an operation for conveying an identity of the given polygonal-shaped named route as the named route enclosing the physical target location, when both the target longitude and the target latitude are found to reside within the given polygonal-shaped named route.

Other aspects and advantages of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1A:
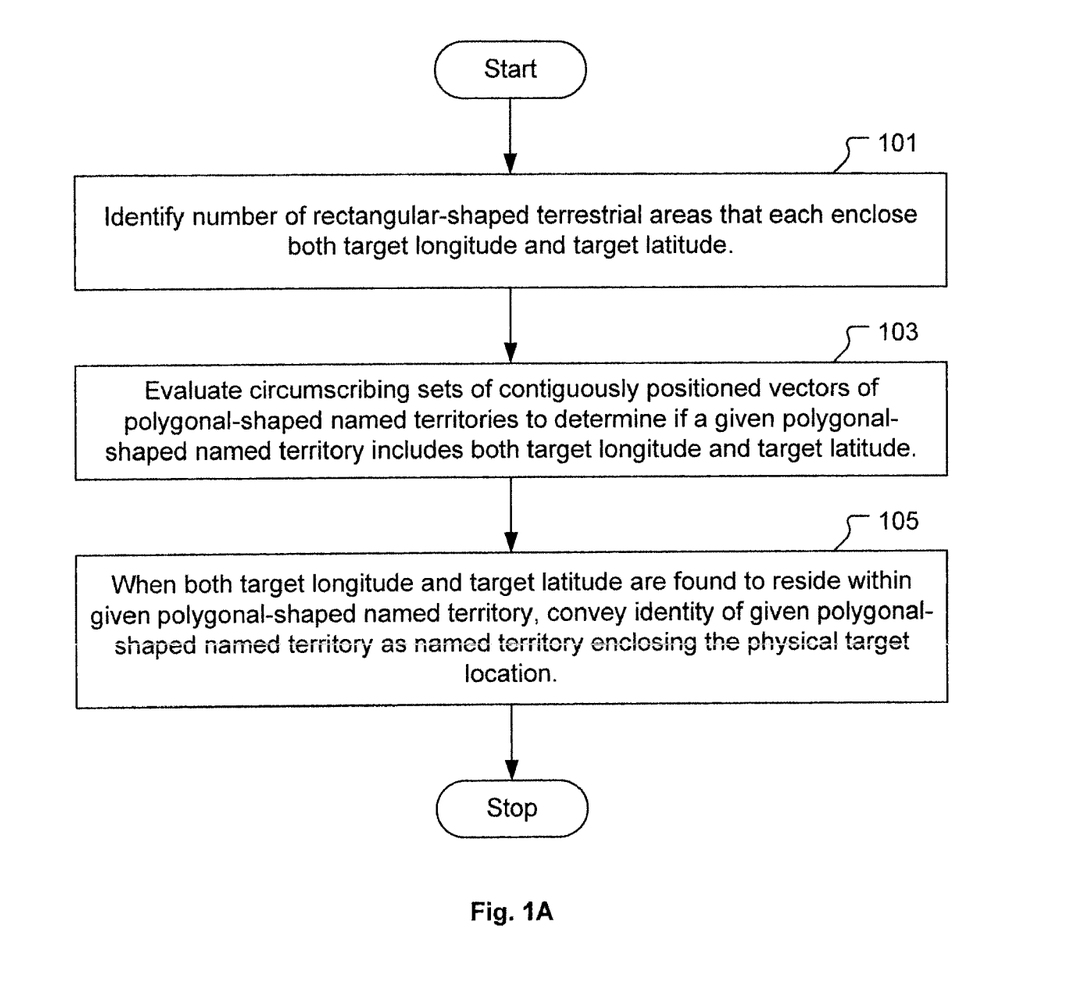
FIG. 1A shows a flowchart of a method for determining an identity of a named territory enclosing a physical target location, in accordance with one embodiment of the present invention.

FIG. 1A shows a flowchart of a method for determining an identity of a named territory enclosing a physical target location, in accordance with one embodiment of the present invention. The physical target location is specified by a target longitude and a target latitude. The method includes an operation 101 for identifying a number of rectangular-shaped terrestrial areas that each enclose both the target longitude and the target latitude. Each of the number of identified rectangular-shaped terrestrial areas respectively encloses a number of polygonal-shaped named territories. Each polygonal-shaped named territory is defined by a respective circumscribing set of contiguously positioned vectors. In various embodiments, the identity of each polygonal-shaped named territory may be either a country, a territory, a state, a county, a city, a district, or any other named municipality.

Figure 2A:
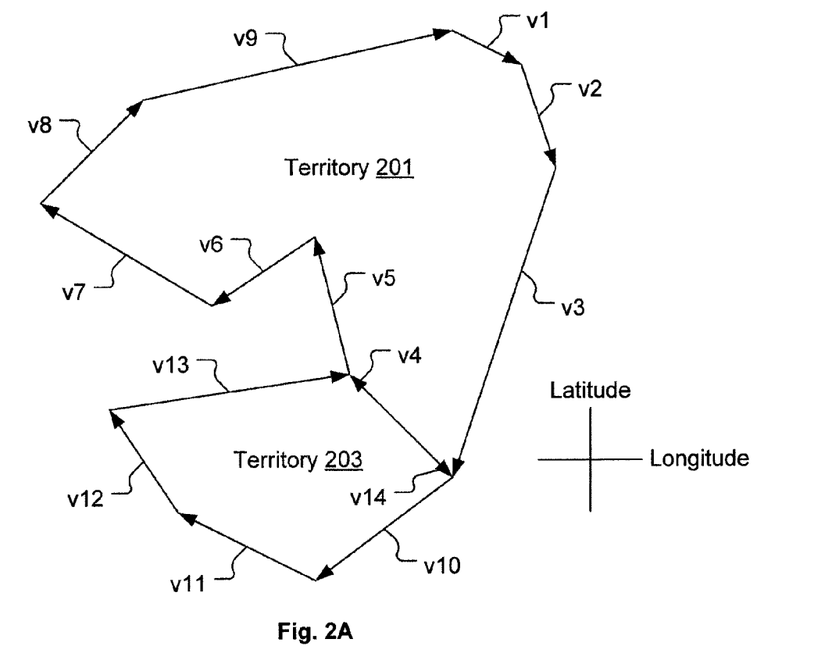
FIG. 2A shows a number of exemplary polygonal-shaped named territories, in accordance with one embodiment of the present invention.

FIG. 2A shows a number of exemplary polygonal-shaped named territories 201 and 203, in accordance with one embodiment of the present invention. Each of the polygonal-shaped named territories 201 and 203 has a corresponding vectorized description defined by a respective circumscribing set of contiguously positioned vectors. For example, territory 201 has a vectorized description defined by a circumscribing set of contiguously positioned vectors v1, v2, v3, v4, v5, v6, v7, v8, and v9. Similarly, territory 203 has a vectorized description defined by a circumscribing set of contiguously positioned vectors v10, v11, v12, v13, and v14. It should be understood that each vector is defined by a pair of line segment end-points, wherein each line segment end-point is defined by a latitude value and a longitude value.

Figure 2B:
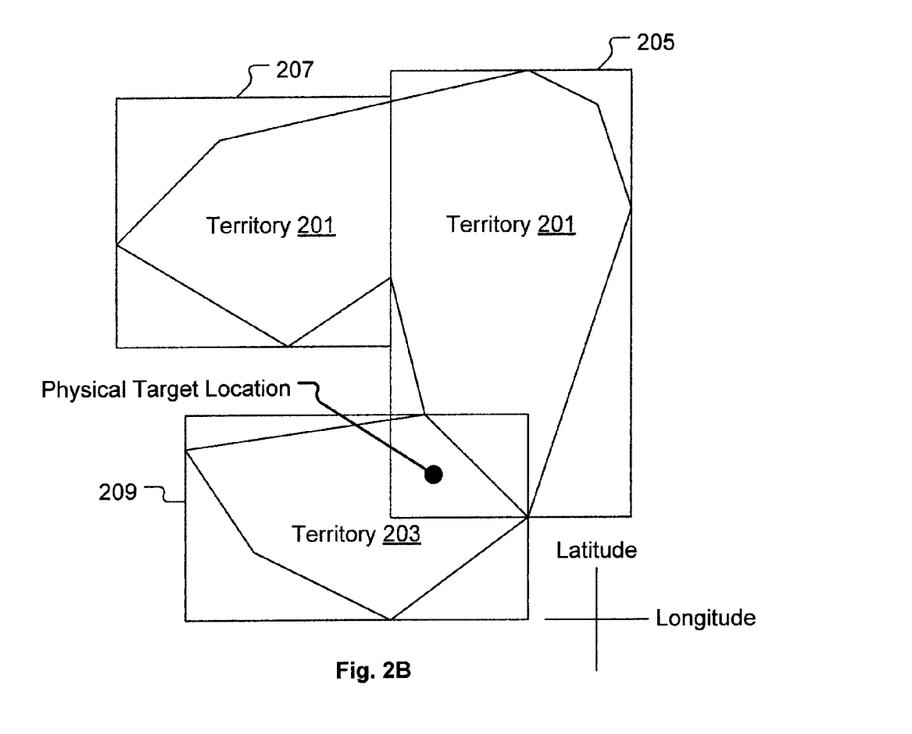
FIG. 2B shows a number of rectangular-shaped terrestrial areas defined to enclose the exemplary polygonal-shaped named territories of FIG. 2A, in accordance with one embodiment of the present invention.

FIG. 2B shows a number of rectangular-shaped terrestrial areas 205, 207, and 209 defined to enclose the exemplary polygonal-shaped named territories of FIG. 2A, in accordance with one embodiment of the present invention. Each rectangular-shaped terrestrial area, e.g., 205, 207, 209, is defined by a corresponding set of minimum longitude, maximum longitude, minimum latitude, and maximum latitude. In one embodiment, each rectangular-shaped terrestrial area is defined to enclose its corresponding polygonal-shaped named territory as tightly as possible. In this embodiment, the minimum longitude of a given rectangular-shaped terrestrial area is equal to a least longitudinal value of any vector coordinate within the vectorized description of the polygonal-shaped named territory corresponding to the given rectangular-shaped terrestrial area. For example, as shown in FIG. 2B, the minimum longitude of the rectangular-shaped terrestrial area 209 is equal to the least longitudinal value of any vector (v10, v11, v12, v13, v14) coordinate within the vectorized description of the polygonal-shaped named territory 203.

Similarly, the maximum longitude of a given rectangular-shaped terrestrial area is equal to a greatest longitudinal value of any vector coordinate within the vectorized description of the polygonal-shaped named territory corresponding to the given rectangular-shaped terrestrial area. For example, as shown in FIG. 2B, the maximum longitude of the rectangular-shaped terrestrial area 209 is equal to the greatest longitudinal value of any vector (v10, v11, v12, v13, v14) coordinate within the vectorized description of the polygonal-shaped named territory 203.

Also, the minimum latitude of a given rectangular-shaped terrestrial area is equal to a least latitudinal value of any vector coordinate within the vectorized description of the polygonal-shaped named territory corresponding to the given rectangular-shaped terrestrial area. For example, as shown in FIG. 2B, the minimum latitude of the rectangular-shaped terrestrial area 209 is equal to the least latitudinal value of any vector (v10, v11, v12, v13, v14) coordinate within the vectorized description of the polygonal-shaped named territory 203.

Additionally, the maximum latitude of a given rectangular-shaped terrestrial area is equal to a greatest latitudinal value of any vector coordinate within the vectorized description of the polygonal-shaped named territory corresponding to the given rectangular-shaped terrestrial area. For example, as shown in FIG. 2B, the maximum latitude of the rectangular-shaped terrestrial area 209 is equal to the greatest latitudinal value of any vector (v10, v11, v12, v13, v14) coordinate within the vectorized description of the polygonal-shaped named territory 203.

In one embodiment, multiple rectangular-shaped terrestrial areas are defined for a common polygonal-shaped named territory, such that the multiple rectangular-shaped terrestrial areas do not overlap each other. FIG. 2B shows an example in which multiple rectangular-shaped terrestrial areas 205 and 207 are defined for a common polygonal-shaped named territory 201. As shown in FIG. 2B, the multiple rectangular-shaped terrestrial areas 205 and 207 do not overlap each other. In one embodiment, each of the multiple rectangular-shaped terrestrial areas is defined to enclose its corresponding portion of the common polygonal-shaped named territory as tightly as possible. In this embodiment, the multiple rectangular-shaped terrestrial areas are defined to minimize a difference between a combined area of the multiple rectangular-shaped terrestrial areas and an overall area of the common polygonal-shaped named territory.

Moreover, in the example of FIGS. 2A-2B, the rectangular-shaped terrestrial areas 205 and 209 each enclose both the target longitude and the target latitude, and are thereby considered "identified" rectangular-shaped terrestrial areas per operation 101. It should be appreciated that at least one boundary of each "identified" rectangular-shaped terrestrial area crosses at least one boundary of another "identified" rectangular-shaped terrestrial area, wherein each "identified" rectangular-shaped terrestrial area encloses both the target longitude and the target latitude.

The method of FIG. 1A also includes an operation 103 for evaluating the circumscribing sets of contiguously positioned vectors of the number of polygonal-shaped named territories corresponding to the "identified" rectangular-shaped terrestrial areas to determine if a given polygonal-shaped named territory includes both the target longitude and the target latitude. The method further includes an operation 105 for conveying an identity of the given polygonal-shaped named territory as the named territory enclosing the physical target location, when both the target longitude and the target latitude are found to reside within the given polygonal-shaped named territory. In one embodiment, the identity of the given polygonal-shaped named territory is conveyed through digital data communication from which the identity is displayed in either a graphical or textual manner.

Figure 1B:
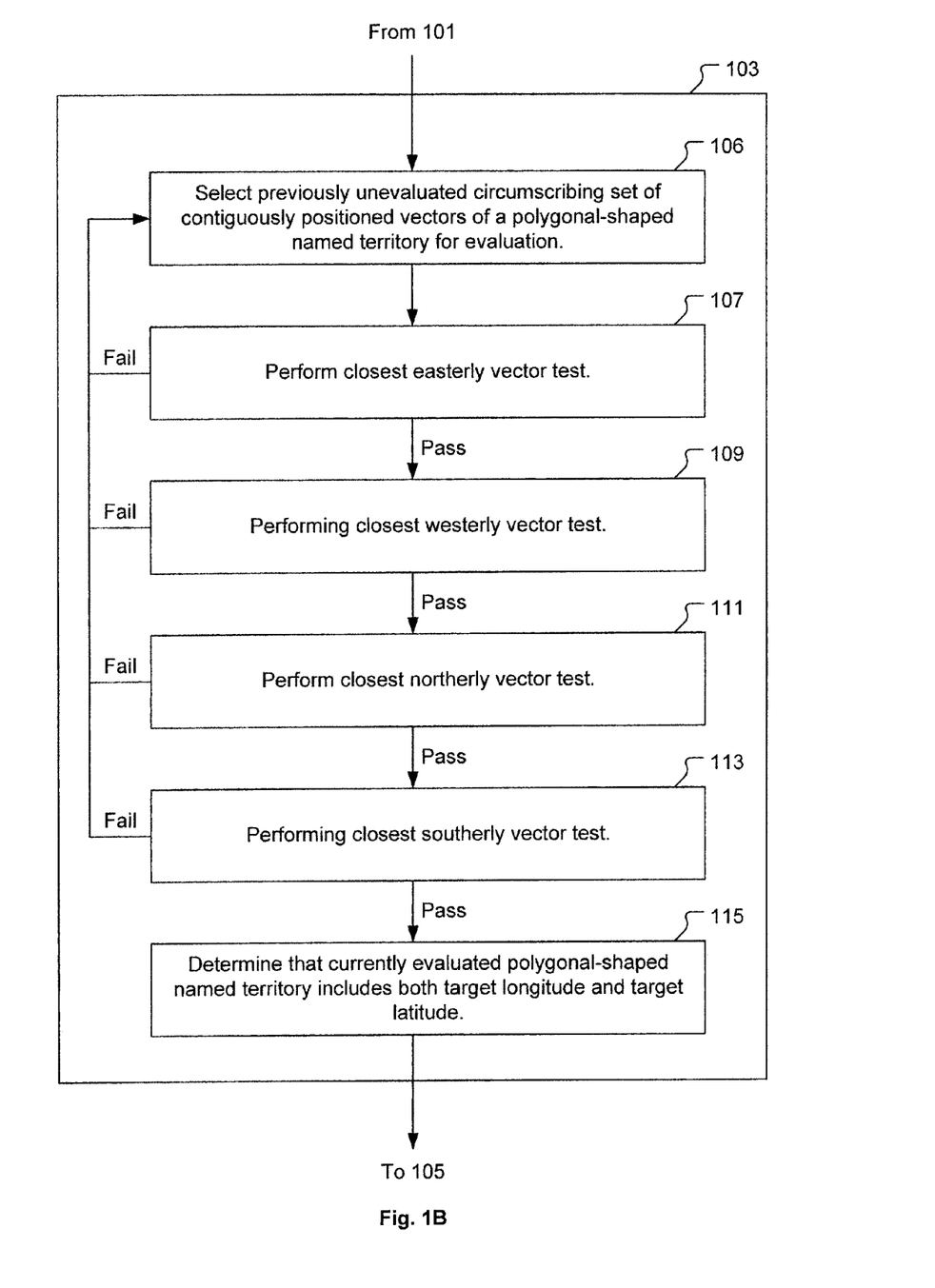
FIG. 1B shows a flowchart of an expanded view of the evaluation operation, in accordance with one embodiment of the present invention.

FIG. 1B shows a flowchart of an expanded view of the evaluation operation 103, in accordance with one embodiment of the present invention. Within the operation 103, an operation 106 is performed to select for evaluation a previously unevaluated circumscribing set of contiguously positioned vectors of a polygonal-shaped named territory. From the operation 103, the method proceeds with an operation 107 for performing a closest easterly vector test. The closest easterly vector test is passed when the target latitude is not greater than a latitude of a greatest latitudinal point along a closest easterly vector to the physical target location, wherein the closest easterly vector also spans the target longitude. Otherwise, the closest easterly vector test is failed.

The closest easterly vector corresponds to a vector within the currently evaluated circumscribing set of contiguously positioned vectors that spans the target longitude and that has a shortest straight-line distance to the physical target location as measured from any point along its length. When a given vector spans the physical target location either longitudinally or latitudinally, the shortest straight-line distance to the physical target location is measured as a perpendicular distance extending from the given vector to the physical target location. Alternatively, when a given vector does not span the physical target location either longitudinally or latitudinally, the shortest straight-line distance to the physical target location is measured as a straight-line distance extending from the physical target location to a closest end of the given vector.

Figure 3A:
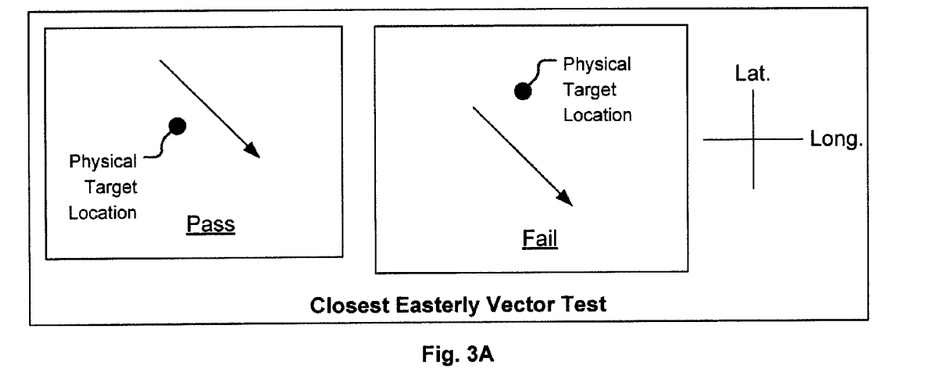
FIG. 3A shows example vectors that respectively pass and fail the closest easterly vector test, in accordance with one embodiment of the present invention.

If the closest easterly vector test is passed, the method proceeds with an operation 109 for performing a closest westerly vector test. If the closest easterly vector test is failed, the method reverts back to the operation 106 for selecting another circumscribing set of contiguously positioned vectors of a polygonal-shaped named territory for evaluation. FIG. 3A shows example vectors that respectively pass and fail the closest easterly vector test, in accordance with one embodiment of the present invention.

Figure 3B:
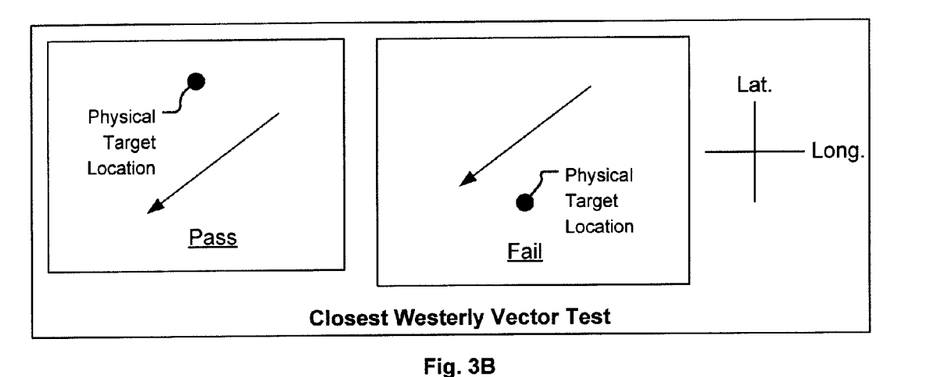
FIG. 3B shows example vectors that respectively pass and fail the closest westerly vector test, in accordance with one embodiment of the present invention.

In the operation 109, a closest westerly vector test is performed. The closest westerly vector test is passed when the target latitude is not less than a latitude of a least latitudinal point along a closest westerly vector to the physical target location, wherein the closest westerly vector also spans the target longitude. Otherwise, the closest westerly vector test is failed. The closest westerly vector corresponds to a vector within the currently evaluated circumscribing set of contiguously positioned vectors that spans the target longitude and that has a shortest straight-line distance to the physical target location as measured from any point along its length. If the closest westerly vector test is passed, the method proceeds with an operation 111 for performing a closest northerly vector test. If the closest westerly vector test is failed, the method reverts back to the operation 106 for selecting another circumscribing set of contiguously positioned vectors of a polygonal-shaped named territory for evaluation. FIG. 3B shows example vectors that respectively pass and fail the closest westerly vector test, in accordance with one embodiment of the present invention.

Figure 3C:
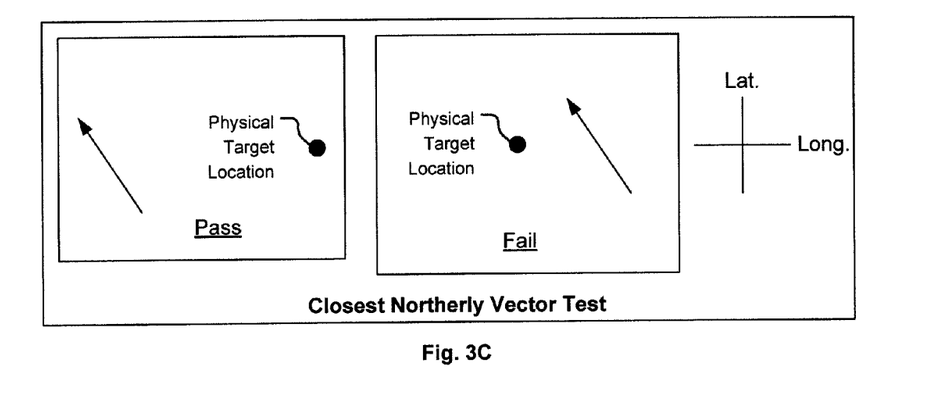
FIG. 3C shows example vectors that respectively pass and fail the closest northerly vector test, in accordance with one embodiment of the present invention.

In the operation 111, a closest northerly vector test is performed. The closest northerly vector test is passed when the target longitude is not less than a longitude of a least longitudinal point along a closest northerly vector to the physical target location, wherein the closest northerly vector also spans the target latitude. Otherwise, the closest northerly vector test is failed. The closest northerly vector corresponds to a vector within the currently evaluated circumscribing set of contiguously positioned vectors that spans the target latitude and that has a shortest straight-line distance to the physical target location as measured from any point along its length. If the closest northerly vector test is passed, the method proceeds with an operation 113 for performing a closest southerly vector test. If the closest northerly vector test is failed, the method reverts back to the operation 106 for selecting another circumscribing set of contiguously positioned vectors of a polygonal-shaped named territory for evaluation. FIG. 3C shows example vectors that respectively pass and fail the closest northerly vector test, in accordance with one embodiment of the present invention.

Figure 3D:
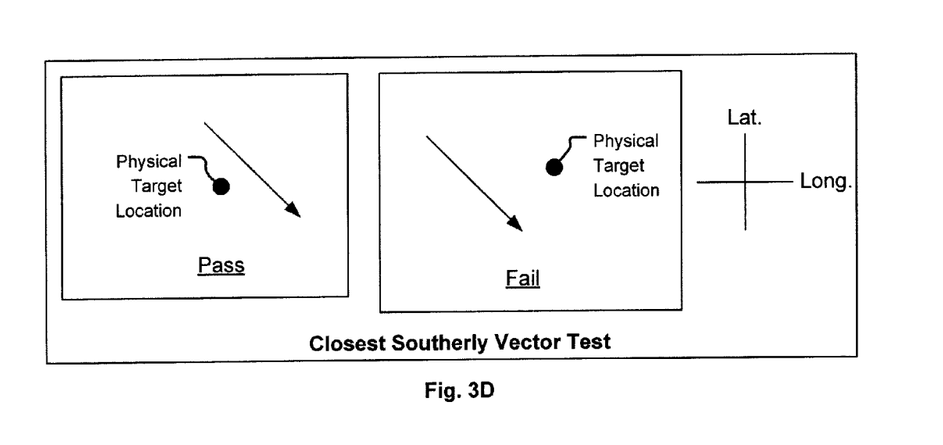
FIG. 3D shows example vectors that respectively pass and fail the closest southerly vector test, in accordance with one embodiment of the present invention.

In the operation 113, a closest southerly vector test is performed. The closest southerly vector test is passed when the target longitude is not greater than a longitude of a greatest longitudinal point along a closest southerly vector to the physical target location, wherein the closest southerly vector also spans the target latitude. Otherwise, the closest southerly vector test is failed. The closest southerly vector corresponds to a vector within the currently evaluated circumscribing set of contiguously positioned vectors that spans the target latitude and that has a shortest straight-line distance to the physical target location as measured from any point along its length. If the closest southerly vector test is passed, the method proceeds with an operation 115. If the closest southerly vector test is failed, the method reverts back to the operation 106 for selecting another circumscribing set of contiguously positioned vectors of a polygonal-shaped named territory for evaluation. FIG. 3D shows example vectors that respectively pass and fail the closest southerly vector test, in accordance with one embodiment of the present invention.

In the operation 115, it is determined that the currently evaluated polygonal-shaped named territory includes both the target longitude and the target latitude. To reach operation 115, each of the closest easterly vector test, closest westerly vector test, closest northerly vector test, and closest southerly vector test must be passed. It should be understood that in each of operations 107, 109, 111, and 113, each of the closest easterly vector, closest westerly vector, closest northerly vector, and closest southerly vector are vectors within the circumscribing set of contiguously positioned vectors presently under evaluation.

In one embodiment, the rectangular-shaped terrestrial areas and corresponding polygonal-shaped named territories are each defined by a number of vector coordinates within a searchable database. Each vector coordinate is defined by a latitude value and a longitude value. In this embodiment, identifying the number of rectangular-shaped terrestrial areas in operation 101 and evaluating the circumscribing sets of contiguously positioned vectors of the number of polygonal-shaped named territories in operation 103 are both performed by querying the searchable database.

In one embodiment, the method of FIGS. 1A-1B is performed using polygonal-shaped named routes as opposed to polygonal-shaped named territories. In this embodiment, the method of FIGS. 1A-1B is performed in the same manner except that the polygonal-shaped named routes are simply substituted for the polygonal-shaped named territories. In this embodiment, the identity of each polygonal-shaped named route can be either a waterway, a road, a railway, or any other named route of conveyance that is substantially stationary. Also, in one embodiment, multiple rectangular-shaped terrestrial areas can be associated with a common polygonal-shaped named route. In this embodiment, each of the multiple rectangular-shaped terrestrial areas is associated with a uniquely named segment of the common polygonal-shaped named route.

Figure 4:
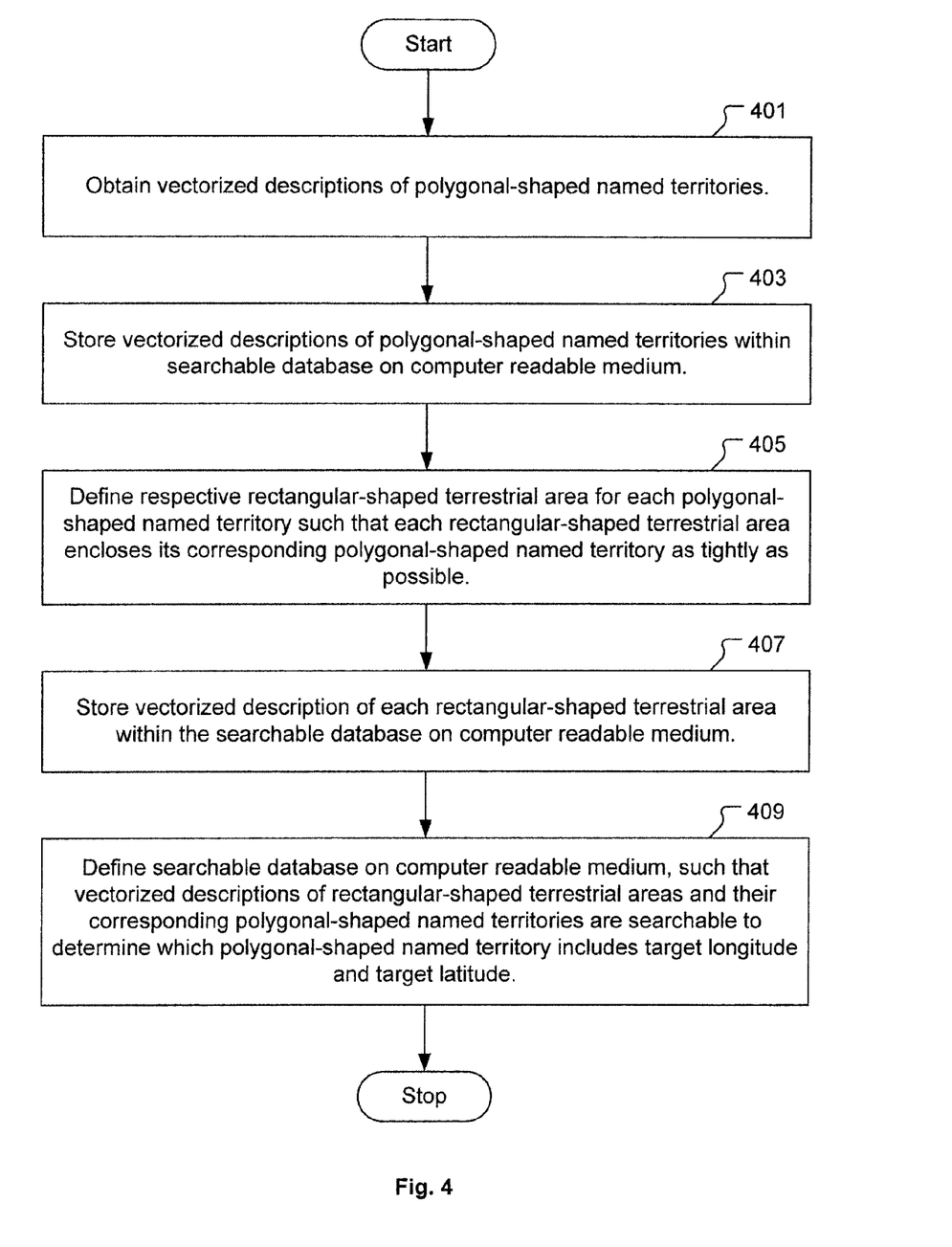
FIG. 4 shows a flowchart of a method for generating a database to determine an identity of a named territory that encloses a physical target location specified by a target longitude and a target latitude.

FIG. 4 shows a flowchart of a method for generating a database to determine an identity of a named territory that encloses a physical target location specified by a target longitude and a target latitude. The method includes an operation 401 for obtaining vectorized descriptions of polygonal-shaped named territories. As previously described with regard to FIG. 2A, the vectorized description of a given polygonal-shaped named territory is defined by a respective circumscribing set of contiguously positioned vectors, wherein each vector is defined by a pair of line segment end-points, and wherein each end-point is defined by a latitude value and a longitude value. In various embodiments, the identity of each polygonal-shaped named territory can be either a country, a territory, a state, a county, a city, a district, or any other named municipality.

The method also includes an operation 403 for storing the vectorized descriptions of the polygonal-shaped named territories within a searchable database on a computer readable medium. The database referenced with regard to the method of FIG. 4 can be essentially any type of digital database that is stored on a computer system, provides for structured storage of data therein, and provides for query of the structured data stored therein.

The method also includes an operation 405 for defining a respective rectangular-shaped terrestrial area for each polygonal-shaped named territory such that each rectangular-shaped terrestrial area encloses its corresponding polygonal-shaped named territory as tightly as possible. As described above with regard to FIG. 2B, each rectangular-shaped terrestrial area is defined by a corresponding set of minimum longitude, maximum longitude, minimum latitude, and maximum latitude. In one embodiment, multiple rectangular-shaped terrestrial areas are defined for a common polygonal-shaped named territory. In this embodiment, the multiple rectangular-shaped terrestrial areas do not overlap each other. Also, in one embodiment, each of the multiple rectangular-shaped terrestrial areas encloses its corresponding portion of the common polygonal-shaped named territory as tightly as possible. More specifically, the multiple rectangular-shaped terrestrial areas can be defined to minimize a difference between a combined area of the multiple rectangular-shaped terrestrial areas and an overall area of the common polygonal-shaped named territory. It should be understood that each of the multiple rectangular-shaped terrestrial areas is stored within the searchable database on the computer readable medium in association with the common polygonal-shaped named territory.

The method further includes an operation 407 for storing a vectorized description of each rectangular-shaped terrestrial area within the searchable database on the computer readable medium. Additionally, the method includes an operation 409 for defining the searchable database on the computer readable medium, such that vectorized descriptions of the rectangular-shaped terrestrial areas and their corresponding polygonal-shaped named territories are searchable to determine which polygonal-shaped named territory includes the target longitude and target latitude.

It should be understood that the invention described herein can be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for determining an identity of a named territory enclosing a physical target location specified by a target longitude and a target latitude, comprising:
    identifying a number of rectangular-shaped terrestrial areas that each enclose both the target longitude and the target latitude, wherein each of the number of identified rectangular-shaped terrestrial areas respectively encloses a number of polygonal-shaped named territories, and wherein each polygonal-shaped named territory is defined by a respective circumscribing set of contiguously positioned vectors;
    evaluating the circumscribing sets of contiguously positioned vectors of the number of polygonal-shaped named territories to determine if a given polygonal-shaped named territory includes both the target longitude and the target latitude; and
    conveying an identity of the given polygonal-shaped named territory as the named territory enclosing the physical target location when both the target longitude and the target latitude are found to reside within the given polygonal-shaped named territory.

2. The method of claim 1, wherein evaluating the circumscribing set of contiguously positioned vectors of a given polygonal-shaped named territory includes determining that the given polygonal-shaped named territory includes both the target longitude and the target latitude when all of the following are true,
    the target latitude is not greater than a latitude of a greatest latitudinal point along a closest easterly vector to the physical target location that spans the target longitude, the target latitude is not less than a latitude of a least latitudinal point along a closest westerly vector to the physical target location that spans the target longitude, the target longitude is not less than a longitude of a least longitudinal point along a closest northerly vector to the physical target location that spans the target latitude, and the target longitude is not greater than a longitude of a greatest longitudinal point along a closest southerly vector to the physical target location that spans the target latitude, wherein each of the closest easterly vector, closest westerly vector, closest northerly vector, and closest southerly vector are vectors within the circumscribing set of contiguously positioned vectors under evaluation.

3. The method of claim 2, wherein the closest easterly vector corresponds to a first vector within the circumscribing set of contiguously positioned vectors that has a shortest straight-line distance to the physical target location as measured from any point along a length of the first vector, and wherein the closest westerly vector corresponds to a second vector within the circumscribing set of contiguously positioned vectors that has a shortest straight-line distance to the physical target location as measured from any point along a length of the second vector, and wherein the closest northerly vector corresponds to a third vector within the circumscribing set of contiguously positioned vectors that has a shortest straight-line distance to the physical target location as measured from any point along a length of the third vector, and wherein the closest southerly vector corresponds to a fourth vector within the circumscribing set of contiguously positioned vectors that has a shortest straight-line distance to the physical target location as measured from any point along a length of the fourth vector.

4. The method of claim 3, wherein the shortest straight-line distance to the physical target location is measured as a perpendicular distance extending from a given vector to the physical target location when the given vector spans the physical target location either longitudinally or latitudinally, and wherein the shortest straight-line distance to the physical target location is measured as a straight-line distance extending from the physical target location to a closest end of the given vector when the given vector does not span the physical target location either longitudinally or latitudinally.

5. The method of claim 1, wherein the rectangular-shaped terrestrial areas and corresponding polygonal-shaped named territories are each defined by a number of vector coordinates within a searchable database, wherein each vector coordinate is defined by a latitude value and a longitude value.

6. The method of claim 5, wherein identifying the number of rectangular-shaped terrestrial areas and evaluating the circumscribing sets of contiguously positioned vectors of the number of polygonal-shaped named territories are both performed by querying the searchable database.

7. The method of claim 1, wherein each rectangular-shaped terrestrial area is defined to enclose its corresponding polygonal-shaped named territory as tightly as possible.

8. The method of claim 1, wherein at least one boundary of each identified rectangular-shaped terrestrial areas crosses at least one boundary of another identified rectangular-shaped terrestrial area.

9. The method of claim 1, wherein the identity of each polygonal-shaped named territory is either a country, a territory, a state, a county, a city, a district, or any other named municipality.

10. The method of claim 1, wherein the identity of the given polygonal-shaped named territory is conveyed through a digital data communication from which the identity is displayed in either a graphical or textual manner.

11. A method for generating a database to determine an identity of a named territory enclosing a physical target location specified by a target longitude and a target latitude, comprising:

obtaining vectorized descriptions of polygonal-shaped named territories;

storing the vectorized descriptions of the polygonal-shaped named territories within a searchable database on a computer readable medium;

defining a respective rectangular-shaped terrestrial area for each polygonal-shaped named territory such that each rectangular-shaped terrestrial area encloses its corresponding polygonal-shaped named territory as tightly as possible;

storing a vectorized description of each rectangular-shaped terrestrial area within the searchable database on the computer readable medium; and defining the searchable database on the computer readable medium such that vectorized descriptions of the rectangular-shaped terrestrial areas and their corresponding polygonal-shaped named territories are searchable to determine which polygonal-shaped named territory includes the target longitude and target latitude.

12. The method of claim 11, wherein the vectorized description of a given polygonal-shaped named territory is defined by a respective circumscribing set of contiguously positioned vectors, wherein each vector is defined by a pair of line segment end-points, wherein each end-point is defined by a latitude value and a longitude value.

13. The method of claim 11, wherein each rectangular-shaped terrestrial area is defined by a corresponding set of minimum longitude, maximum longitude, minimum latitude, and maximum latitude.

14. The method of claim 13, wherein the minimum longitude of a given rectangular-shaped terrestrial area is equal to a least longitudinal value of any vector coordinate within the vectorized description of the polygonal-shaped named territory corresponding to the given rectangular-shaped terrestrial area, and wherein the maximum longitude of the given rectangular-shaped terrestrial area is equal to a greatest longitudinal value of any vector coordinate within the vectorized description of the polygonal-shaped named territory corresponding to the given rectangular-shaped terrestrial area, and wherein the minimum latitude of the given rectangular-shaped terrestrial area is equal to a least latitudinal value of any vector coordinate within the vectorized description of the polygonal-shaped named territory corresponding to the given rectangular-shaped terrestrial area, and wherein the maximum latitude of the given rectangular-shaped terrestrial area is equal to a greatest latitudinal value of any vector coordinate within the vectorized description of the polygonal-shaped named territory corresponding to the given rectangular-shaped terrestrial area.

15. The method of claim 11, wherein multiple rectangular-shaped terrestrial areas are defined for a common polygonal-shaped named territory, such that the multiple rectangular-shaped terrestrial areas do not overlap each other, and such that each of the multiple rectangular-shaped terrestrial areas encloses its corresponding portion of the common polygonal-shaped named territory as tightly as possible, and
  wherein each of the multiple rectangular-shaped terrestrial areas is stored within the searchable database on the computer readable medium in association with the common polygonal-shaped named territory.

16. The method of claim 15, wherein the multiple rectangular-shaped terrestrial areas are defined to minimize a difference between a combined area of the multiple rectangular-shaped terrestrial areas and an overall area of the common polygonal-shaped named territory.

17. The method of claim 11, wherein the identity of each polygonal-shaped named territory is either a country, a territory, a state, a county, a city, a district, or any other named municipality.

18. A method for determining an identity of a named route closest to a physical target location specified by a target longitude and a target latitude, comprising:
  identifying a number of rectangular-shaped terrestrial areas that each enclose both the target longitude and the target latitude, wherein each of the number of identified rectangular-shaped terrestrial areas respectively encloses a portion of polygonal-shaped named route, and wherein each polygonal-shaped named route is defined by a respective circumscribing set of contiguously positioned vectors;
  evaluating the circumscribing sets of contiguously positioned vectors of the number of polygonal-shaped named routes to determine if a given polygonal-shaped named route includes both the target longitude and the target latitude; and
  conveying an identity of the given polygonal-shaped named route as the named route enclosing the physical target location when both the target longitude and the target latitude are found to reside within the given polygonal-shaped named route.

19. The method of claim 18, wherein evaluating the circumscribing set of contiguously positioned vectors of a given polygonal-shaped named route includes determining that the given polygonal-shaped named route includes both the target longitude and the target latitude when all of the following are true,
  the target latitude is not greater than a latitude of a greatest latitudinal point along a closest easterly vector to the physical target location that spans the target longitude,
  the target latitude is not less than a latitude of a least latitudinal point along a closest westerly vector to the physical target location that spans the target longitude,
  the target longitude is not less than a longitude of a least longitudinal point along a closest northerly vector to the physical target location that spans the target latitude, and
  the target longitude is not greater than a longitude of a greatest longitudinal point along a closest southerly vector to the physical target location that spans the target latitude,
  wherein each of the closest easterly vector, closest westerly vector, closest northerly vector, and closest southerly vector are vectors within the circumscribing set of contiguously positioned vectors under evaluation.

20. The method of claim 19, wherein the closest easterly vector corresponds to a first vector within the circumscribing set of contiguously positioned vectors that has a shortest straight-line distance to the physical target location as measured from any point along a length of the first vector, and
  wherein the closest westerly vector corresponds to a second vector within the circumscribing set of contiguously positioned vectors that has a shortest straight-line distance to the physical target location as measured from any point along a length of the second vector, and
  wherein the closest northerly vector corresponds to a third vector within the circumscribing set of contiguously positioned vectors that has a shortest straight-line distance to the physical target location as measured from any point along a length of the third vector, and
  wherein the closest southerly vector corresponds to a fourth vector within the circumscribing set of contiguously positioned vectors that has a shortest straight-line distance to the physical target location as measured from any point along a length of the fourth vector.

21. The method of claim 20, wherein the shortest straight-line distance to the physical target location is measured as a perpendicular distance extending from a given vector to the physical target location when the given vector spans the physical target location either longitudinally or latitudinally, and
  wherein the shortest straight-line distance to the physical target location is measured as a straight-line distance extending from the physical target location to a closest end of the given vector when the given vector does not span the physical target location either longitudinally or latitudinally.

22. The method of claim 18, wherein the rectangular-shaped terrestrial areas and corresponding polygonal-shaped named routes are each defined by a number of vector coordinates within a searchable database, wherein each vector coordinate is defined by a latitude value and a longitude value.

23. The method of claim 22, wherein identifying the number of rectangular-shaped terrestrial areas and evaluating the circumscribing sets of contiguously positioned vectors of the number of polygonal-shaped named routes are both performed by querying the searchable database.

24. The method of claim 18, wherein each rectangular-shaped terrestrial area is defined to enclose its corresponding polygonal-shaped named route as tightly as possible.

25. The method of claim 18, wherein the identity of each polygonal-shaped named route is either a waterway, a road, a railway, or any other named route of conveyance that is substantially stationary.

26. The method of claim 18, wherein multiple rectangular-shaped terrestrial areas are defined for a common polygonal-shaped named route, such that the multiple rectangular-shaped terrestrial areas do not overlap each other, and such that each of the multiple rectangular-shaped terrestrial areas encloses its corresponding portion of the common polygonal-shaped named route as tightly as possible, and
  wherein each of the multiple rectangular-shaped terrestrial areas is associated with the common polygonal-shaped named route.

27. The method of claim 26, wherein each of the multiple rectangular-shaped terrestrial areas is associated with a uniquely named segment of the common polygonal-shaped named route.

28. The method of claim 18, wherein the identity of the given polygonal-shaped named route is conveyed through a digital data communication from which the identity is displayed in either a graphical or textual manner.

* * * * *